(12) United States Patent
Adachi et al.

(10) Patent No.: US 10,510,159 B2
(45) Date of Patent: Dec. 17, 2019

(54) INFORMATION PROCESSING APPARATUS, CONTROL METHOD FOR INFORMATION PROCESSING APPARATUS, AND NON-TRANSITORY COMPUTER-READABLE STORAGE MEDIUM

(71) Applicant: CANON KABUSHIKI KAISHA, Tokyo (JP)

(72) Inventors: Daichi Adachi, Tokyo (JP); Koji Makita, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 93 days.

(21) Appl. No.: 15/826,083

(22) Filed: Nov. 29, 2017

(65) Prior Publication Data
US 2018/0150971 A1    May 31, 2018

(30) Foreign Application Priority Data

Nov. 30, 2016   (JP) ................................. 2016-233501

(51) Int. Cl.
*G06T 7/73*     (2017.01)
*G06T 11/60*    (2006.01)
(Continued)

(52) U.S. Cl.
CPC ............ *G06T 7/73* (2017.01); *G06K 9/00671* (2013.01); *G06K 9/2063* (2013.01); *G06T 7/74* (2017.01);
(Continued)

(58) Field of Classification Search
CPC combination set(s) only.
See application file for complete search history.

(56) References Cited

U.S. PATENT DOCUMENTS 7,084,887 B1 *   8/2006  Sato ..................... A63F 13/10
                                                   345/633
7,124,053 B2 *  10/2006  Tanaka ................... G06T 7/80
                                                   702/152
(Continued)

FOREIGN PATENT DOCUMENTS

JP           2014-112056 A     6/2014

OTHER PUBLICATIONS

Andrew J. Davison, "Real-Time Simultaneous Localisation and Mapping with a Single Camera," Proceedings of the Ninth IEEE International Conference on Computer Vision, vol. 2, Oct. 2003, pp. 1-8.

(Continued)

*Primary Examiner* — Tsung Yin Tsai
(74) *Attorney, Agent, or Firm* — Carter, DeLuca & Farrell LLP

(57) ABSTRACT

An information processing apparatus comprising: a marker detection unit configured to detect one or more markers from an image obtained by capturing a physical space by an image capturing unit; a feature detection unit configured to detect a feature from the image; an estimation unit configured to estimate a position and orientation of the image capturing unit based on a detection result obtained by the marker detection unit and a detection result obtained by the feature detection unit; a stability obtaining unit configured to obtain stability of estimation of the position and orientation when some markers of the one or more markers are removed; and a determination unit configured to determine, based on the stability, whether the some markers are removable.

13 Claims, 14 Drawing Sheets

(51) Int. Cl.
*G06K 9/00* (2006.01)
*G06K 9/20* (2006.01)

(52) U.S. Cl.
CPC .......... *G06T 11/60* (2013.01); *G06T 2200/04* (2013.01); *G06T 2207/30204* (2013.01); *G06T 2207/30244* (2013.01)

(56) References Cited

U.S. PATENT DOCUMENTS

| | | | | |
|---|---|---|---|---|
| 7,519,218 | B2* | 4/2009 | Takemoto | G02B 27/017 |
| | | | | 382/165 |
| 7,671,875 | B2* | 3/2010 | Anabuki | G06F 3/0325 |
| | | | | 345/632 |
| 8,170,339 | B2* | 5/2012 | Takemoto | G06K 9/209 |
| | | | | 382/181 |
| 8,625,898 | B2* | 1/2014 | Osako | G06K 9/3275 |
| | | | | 382/181 |
| 8,655,076 | B2* | 2/2014 | Nakajima | G06K 9/468 |
| | | | | 382/190 |
| 2005/0234333 | A1* | 10/2005 | Takemoto | G02B 27/017 |
| | | | | 600/426 |
| 2008/0037901 | A1* | 2/2008 | Yonezawa | G06K 9/3216 |
| | | | | 382/291 |
| 2008/0069405 | A1* | 3/2008 | Endo | G01B 11/002 |
| | | | | 382/106 |
| 2015/0243016 | A1* | 8/2015 | Moteki | G06T 7/70 |
| | | | | 382/103 |
| 2017/0263054 | A1 | 9/2017 | Yamasaki et al. | |

OTHER PUBLICATIONS

Norihiko Kawai et al., "Image Inpainting by Minimizing Energy Based on Pattern Similarity Considering Brightness Change and Spatial Locality," IEICE Transactions on Information and Systems, vol. J91-D, No. 9, pp. 2293-2304, Sep. 2008.

Josef Sivic et al., "Video Google: A Text Retrieval Approach to Object Matching in Videos," Proceedings of the Ninth IEEE International Conference on Computer Vision, ICCV 2003, vol. 2, pp. 1-8, Nov. 2003.

* cited by examiner

FIG. 3
| MARKER PATTERN | MARKER ID | CORNER ID: 1 (X [mm], Y [mm], Z [mm]) | CORNER ID: 2 (X [mm], Y [mm], Z [mm]) | CORNER ID: 3 (X [mm], Y [mm], Z [mm]) | CORNER ID: 4 (X [mm], Y [mm], Z [mm]) |
|---|---|---|---|---|---|
|  | 1968 | (−120, 0, −250) | (−20, 0, −250) | (−20, 0, −150) | (−120, 0, −150) |
|  | 1969 | (20, 0, −250) | (120, 0, −250) | (120, 0, −150) | (20, 0, −150) |
|  | 1970 | (−110, 0, −110) | (110, 0, −110) | (110, 0, 110) | (−110, 0, 110) |
| ... | | | | | |
DESCRIPTION IN TEXT FILE

INFORMATION PROCESSING APPARATUS, CONTROL METHOD FOR INFORMATION PROCESSING APPARATUS, AND NON-TRANSITORY COMPUTER-READABLE STORAGE MEDIUM

BACKGROUND OF THE INVENTION

Field of the Invention

The present invention relates to an information processing apparatus, a control method for the information processing apparatus, and a non-transitory computer-readable storage medium.

Description of the Related Art

In recent years, techniques associated with AR (Augmented Reality) and MR (Mixed Reality) of combining virtual information and CG (Computer Graphics) models with a physical space are attracting attention. In many cases, combining with the physical space is performed by recognizing a three-dimensional shape in the physical space from images captured by a camera. Examples of a representative method of recognizing a three-dimensional shape in the physical space are SLAM (Simultaneous Localisation And Mapping) and a method of detecting, from an image, a marker (to be simply referred to as a marker hereinafter) whose shape has a known texture. The basic principle of SLAM is described in Andrew J. Davison, "Real-Time Simultaneous Localisation and Mapping with a Single Camera", Proceedings of the 9th IEEE International Conference on Computer Vision Volume 2, 2003, pp. 1403-1410. In SLAM, feature points (to be referred to as features hereinafter), in the physical space, detected from each image captured by a camera while moving are tracked for each frame, thereby successively estimating the three-dimensional coordinates of the features in the physical three-dimensional space and the position and orientation of the camera.

Japanese Patent Laid-Open No. 2014-112056 discloses a technique of improving the accuracy of estimation by using both a marker and SLAM. In Japanese Patent Laid-Open No. 2014-112056, a result of detecting features from a group ϕ of images obtained by capturing a marker arranged in the physical space and performing estimation by SLAM is saved as a map, and features detected from a group ϕC of images captured by removing the marker are associated with the map, thereby performing SLAM with high accuracy.

However, in the technique described in Japanese Patent Laid-Open No. 2014-112056, the user cannot determine when the marker may be removed. If the marker is removed while the distribution of the features in the group ϕ of images is insufficient, association with the features in the group ϕC of images is insufficient, thereby destabilizing estimation of SLAM.

The present invention has been made in consideration of the above problem, and provides a technique for readily recognizing a removable marker without destabilizing estimation of the position and orientation.

SUMMARY OF THE INVENTION

According to one aspect of the present invention, there is provided an information processing apparatus comprising: a marker detection unit configured to detect one or more markers from an image obtained by capturing a physical space by an image capturing unit; a feature detection unit configured to detect a feature from the image; an estimation unit configured to estimate a position and orientation of the image capturing unit based on a detection result obtained by the marker detection unit and a detection result obtained by the feature detection unit; a stability obtaining unit configured to obtain stability of estimation of the position and orientation when some markers of the one or more markers are removed; and a determination unit configured to determine, based on the stability, whether the some markers are removable.

Further features of the present invention will become apparent from the following description of exemplary embodiments with reference to the attached drawings.

BRIEF DESCRIPTION OF THE DRAWINGS

FIG. 3 is a table showing a text file in which marker information is described according to the first embodiment;

DESCRIPTION OF THE EMBODIMENTS

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

<Overview>

The first embodiment will describe an example of selecting one marker based on the sizes of markers to calculate the stability of estimation of SLAM, and calculating a difference in estimation result of SLAM based on the presence/absence of a marker.

<Apparatus Arrangement>

Figure 1:
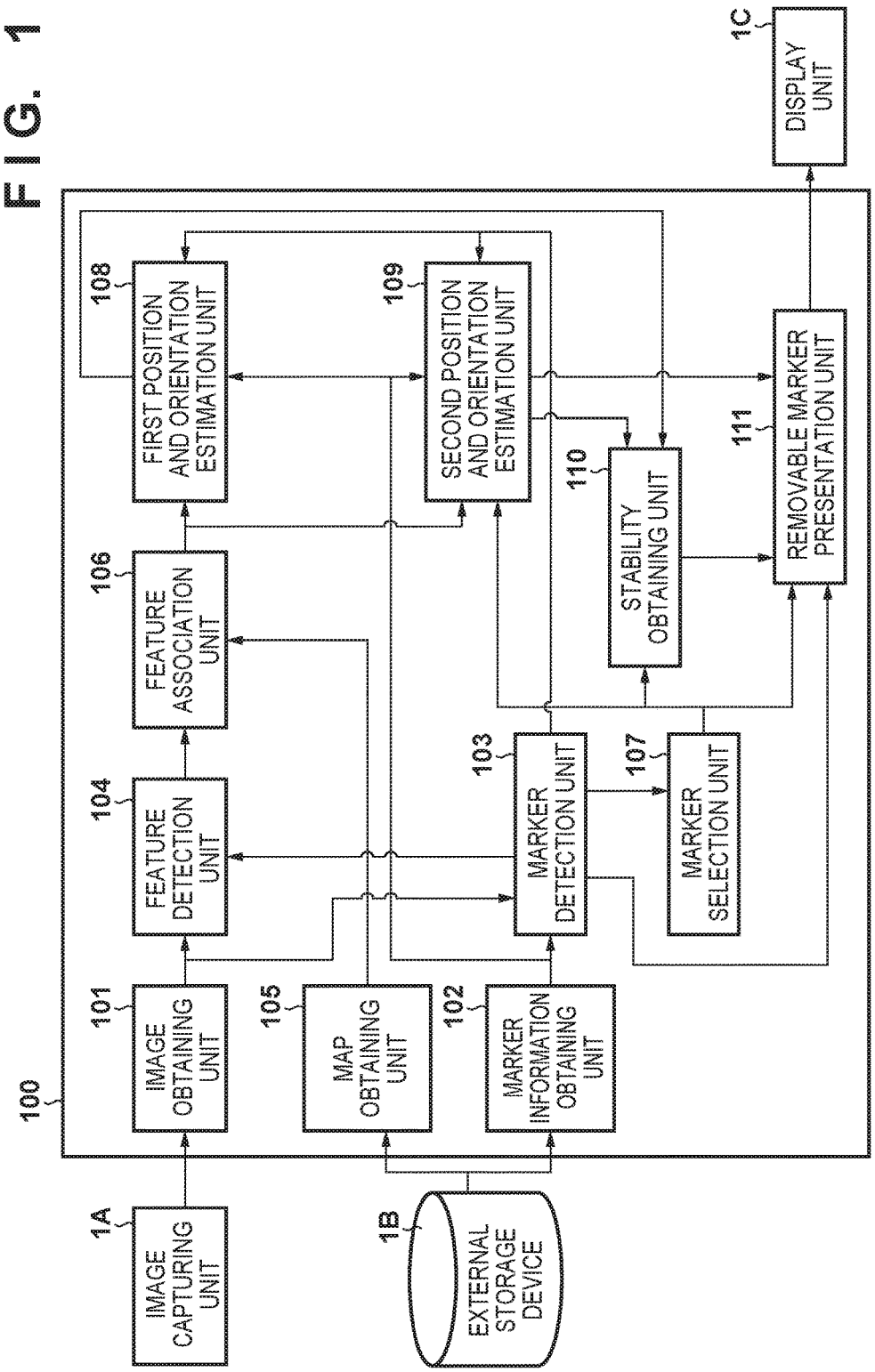
FIG. 1 is a block diagram for explaining the arrangement of an information processing apparatus according to the first embodiment.

FIG. 1 is a block diagram showing an example of the arrangement of an information processing apparatus 100 according to this embodiment. The information processing apparatus 100 is connected to an external image capturing unit 1A and an external display unit 1C via a vide cable (USB (Universal Serial Bus) cable or the like). The information processing apparatus 100 is also connected to an external storage device 1B via a SATA (Serial Advanced Technology Attachment) cable or the like.

The information processing apparatus 100 includes an image obtaining unit 101, a marker information obtaining unit 102, a marker detection unit 103, a feature detection unit 104, a map obtaining unit 105, and a feature association unit 106. The information processing apparatus 100 also includes a marker selection unit 107, a first position and orientation estimation unit 108, a second position and orientation estimation unit 109, a stability obtaining unit 110, and a removable marker presentation unit 111. The function of each component of the information processing apparatus 100 is implemented when a control unit (CPU) (not shown) reads out a program from a memory (not shown) and executes it.

The external image capturing unit 1A is an image capturing apparatus (color camera), and successively transfers captured image data to the image obtaining unit 101. The external storage device 1B is formed by an SSD (Solid State Drive), an HDD (Hard Disk Drive), or the like. The external display unit 1C is a liquid crystal display device, and displays an output MR image.

The image obtaining unit 101 obtains, as an input image, image data transferred by the image capturing unit 1A, and stores it in a memory (not shown).

The marker information obtaining unit 102 loads, from a text file stored in advance in the external storage device 1B, a marker ID, and the three-dimensional coordinates, in a virtual space, of the four corner points of a rectangular marker corresponding to the marker ID, and stores them in the memory (not shown).

The marker detection unit 103 detects rectangular markers from the input image by image processing, and stores the image coordinates of the four corner points of each detected rectangular marker and the ID of each marker in the memory (not shown).

The feature detection unit 104 detects feature points in the physical space included in the input image by image processing, and stores the image coordinates and feature description vectors (descriptors) of the detected feature points in the memory (not shown).

The map obtaining unit 105 obtains map data indicating the feature points in the physical space from the external storage device 1B, and stores them in the memory (not shown). The map data includes pieces of information about the feature points, such as the three-dimensional coordinates of the feature points, images of a camera, that have been obtained in advance by capturing the feature points at a plurality of locations using the image capturing unit 1A, the position and orientation of the camera, and the image coordinates and feature description vectors (descriptors) of the feature points in each image.

The feature association unit 106 associates the feature point in the input image stored in the memory (not shown) with the feature point in the map based on the similarity between the feature description vectors (descriptors), and stores the association information in the memory (not shown).

The marker selection unit 107 selects, from the markers detected from the input image by the marker detection unit 103, one marker having the smallest area on the image, and stores the ID of the selected marker in the memory (not shown).

The first position and orientation estimation unit 108 calculates the position and orientation of the external image capturing unit 1A by image processing based on index information of the feature points associated with each other by the feature association unit 106, the IDs of the markers detected by the marker detection unit 103, and the three-dimensional coordinates of the corner points of the markers obtained by the marker information obtaining unit 102, and stores the calculated position and orientation in the memory (not shown).

The second position and orientation estimation unit 109 calculates the position and orientation of the external image capturing unit 1A by image processing by excluding the marker selected by the marker selection unit 107 and the feature points included in the marker based on the index information of the feature points associated with each other by the feature association unit 106, the IDs of the markers detected by the marker detection unit 103, and the three-dimensional coordinates of the corner points of the markers obtained by the marker information obtaining unit 102, and stores the calculated position and orientation in the memory (not shown).

The stability obtaining unit 110 calculates stability by comparing the estimation results of the first position and orientation estimation unit 108 and the second position and orientation estimation unit 109, and stores the stability in the memory (not shown). A stability calculation method will be described in detail later.

The removable marker presentation unit 111 generates an MR image based on the stability calculated by the stability obtaining unit 110 to present, to the user, whether the marker detected by the marker detection unit 103 and selected by the marker selection unit 107 is removable, and outputs the MR image to the external display unit 1C.

<Processing>

Figure 2:
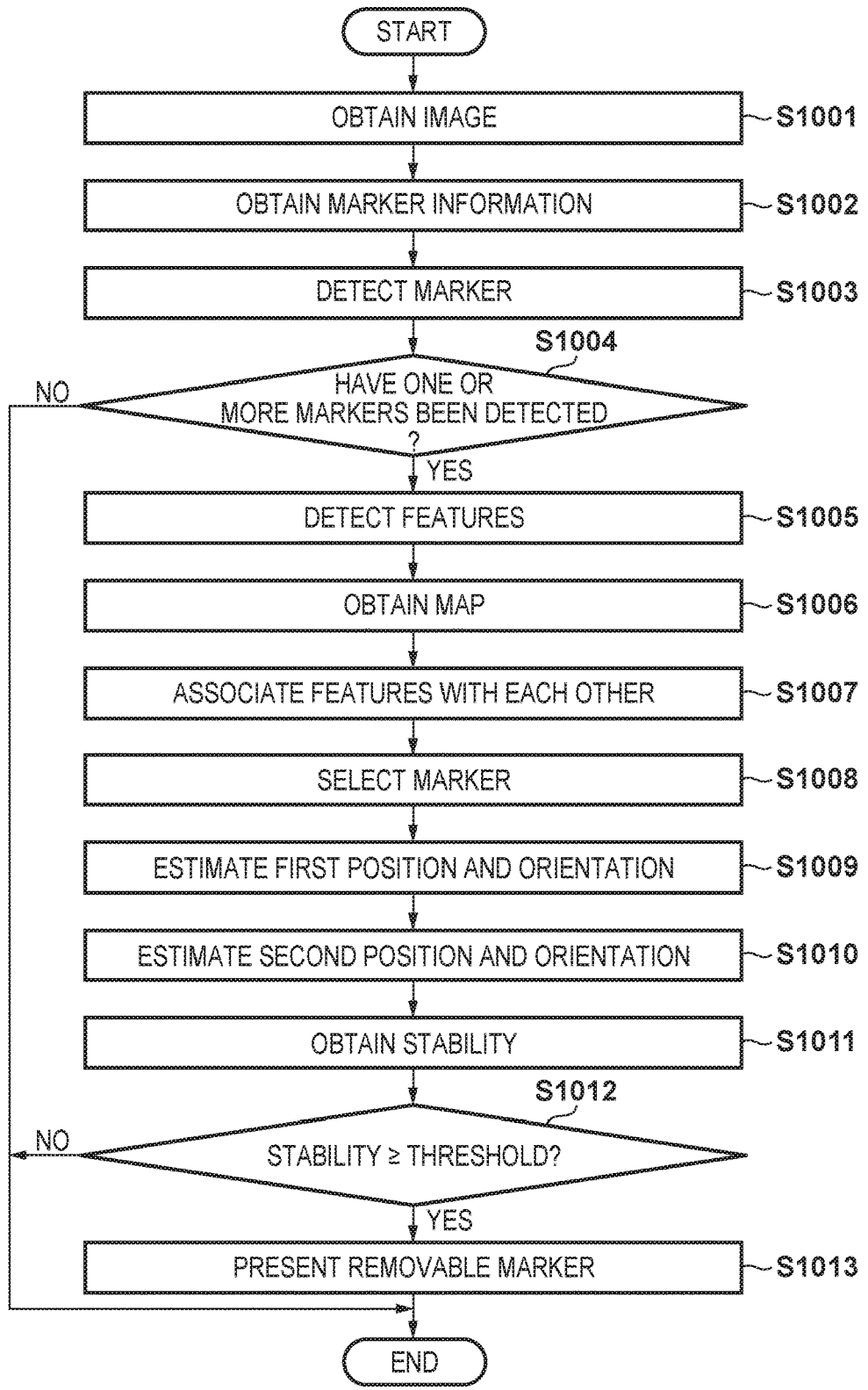
FIG. 2 is a flowchart illustrating the procedure of processing by the information processing apparatus according to the first embodiment.

The procedure of processing executed by the information processing apparatus 100 according to this embodiment will be described with reference to a flowchart shown in FIG. 2. Especially, a stability calculation method and a removable marker presentation method according to this embodiment will be described in detail.

(Step S1001: Image Obtaining Processing)

In step S1001, the image obtaining unit 101 obtains image data as an input image from the external image capturing unit 1A, and stores it in the memory. The image data is data in which the luminance value of each of pixels of RGB channels is described.

(Step S1002: Marker Information Obtaining Processing)

In step S1002, the marker information obtaining unit 102 loads, from a text file stored in advance in the external storage device 1B, the three-dimensional coordinates, in the virtual space, of the four corner points of each of a plurality of rectangular markers having a two-dimensional code pattern and marker IDs, as shown in a table of FIG. 3, and stores them in the memory.

(Step S1003: Marker Detection Processing)

Figure 4:
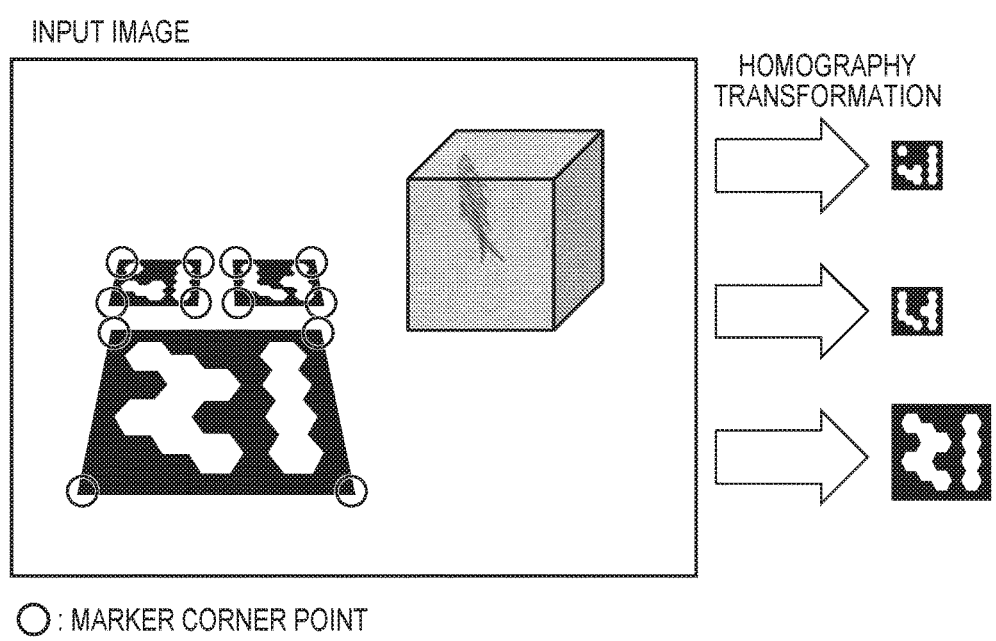
FIG. 4 is a view showing marker corner points according to the first embodiment.

In step S1003, the marker detection unit 103 detects the corner points of each rectangular marker from the input image by marker detection processing, as shown in FIG. 4, and also recognizes a marker ID based on the luminance values of the pixels in each marker. The corner points of each rectangular marker are calculated based on the intersection points of line segments through known line segment detection by edge detection and Hough transform. Furthermore, each marker ID is recognized by transforming the image coordinates of the corner points into an upright rectangular image by nomography transformation, scanning the interior of the image, and performing association with an ID by known pattern matching. The marker detection unit 103 associates the ID with the calculated image coordinates of the corner points on the input image for each marker, and stores them as a marker detection result in the memory.

(Step S1004: Marker Detection Result Determination Processing)

In step S1004, with reference to the marker detection result, the marker detection unit 103 determines whether at least one or more markers have been detected. If it is determined that at least one or more markers have been detected, the process advances to step S1005; otherwise, the process ends.

(Step S1005: Feature Detection Processing)

Figure 5:
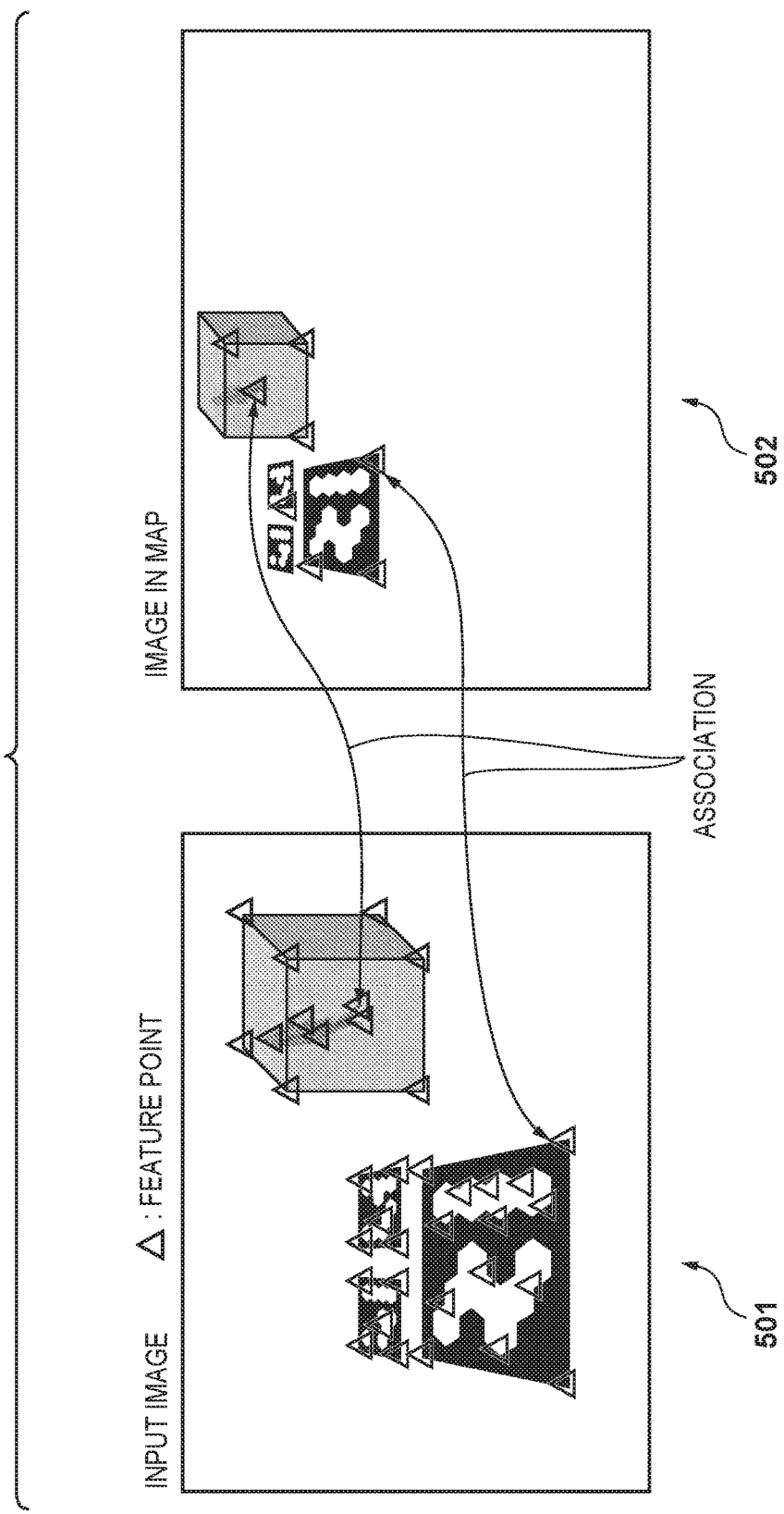
FIG. 5 is a view showing detection and association of feature points according to the first embodiment.

In step S1005, the feature detection unit 104 detects feature points in the physical space included in the input image. A feature point detection algorithm uses known Harris features or SIFT features. In FIG. 5, 501 is a view showing detection of feature points according to this embodiment. As feature points, a plurality of corner points each indicated by a triangle in the input image are detected. The feature information of the detected feature points is calculated using a known feature description vector (descriptor) calculation algorithm such as SIFT, and is stored in the memory together with the image coordinates, on the input image, of the feature points.

(Step S1006: Map Obtaining Processing)

In step S1006, the map obtaining unit 105 obtains, from the external storage device 1B, map data indicating the feature points in the physical space created/stored in advance. As described above, the map data is constituted by the three-dimensional coordinates of the feature points, images of the camera, that have been obtained in advance by capturing the feature points at a plurality of locations using the image capturing unit 1A, the position and orientation of the camera, and the image coordinates and feature description vectors (descriptors) of the feature points in each image. In FIG. 5, 502 shows an example of the images included in the map data, which includes the same physical space as that included in the input image.

In the following description, the position and orientation of the camera is represented as a vector s with six parameters, that is, s=(tx, ty, tz, rx, ry, rz) which is obtained by combining a translation position vector (tx, ty, tz) and a rotation vector (rx, ry, rz) in the three-dimensional space.

(Step S1007: Feature Association Processing)

In step S1007, the feature association unit 106 associates the feature points having high similarity by calculating the inner product of the vectors of the descriptor of each feature point on the input image calculated in step S1005 and the descriptor of each feature point in the map data obtained in step S1006. If, for example, the similarly exceeds a threshold of 0.8, it may be determined that the similarly is high and the feature points may be associated with each other.

In FIGS. 5, 501 and 502 show an example of association between the feature points in the input image and the feature points in the image in the map data. The same feature points in the physical space are associated with each other between the images. In the association information, an image ID in the map, the IDs of the feature points in the image, and the IDs of the feature points on the input image are described. The association information is stored in the memory.

(Step S1008: Marker Selection Processing)

In step S1008, the marker selection unit 107 selects at least some markers from the markers based on the sizes of the markers detected in step S1003. For example, among the markers detected in step S1003, a marker having the smallest area on the input image is selected. In addition, the ID of the selected marker is stored in an internal memory. Note that step S1008 explains an example of selecting one marker having the smallest area on the input image to reduce the influence on position and orientation estimation when the marker is removed. However, a marker having the largest area may be selected or a plurality of markers may be selected.

(Step S1009: First Position and Orientation Estimation Processing)

In step S1009, the first position and orientation estimation unit 108 estimates a camera position and orientation $s_{lmkr}$ of the image capturing unit 1A based on the information of the markers detected in step S1003. Furthermore, the first position and orientation estimation unit 108 estimates again a camera position and orientation $s_{lftr}$ using the association information calculated in step S1007. The information of the estimated camera position and orientation $s_{lftr}$ is stored in the memory. A method of estimating the camera positions and orientations $s_{lmkr}$ and $s_{lftr}$ will be described below.

<Estimation of Camera Position and Orientation $s_{lmkr}$>

When the three-dimensional coordinate point of each corner point of the marker in the physical space is represented by $X_i=(X_i, Y_i, Z_i)$ (i=1, ..., m), coordinate transform in which the point is projected at an image coordinate point $x_i=(x_i, y_i)$ (i=1, ..., m) on a camera projection surface by a pinhole camera model is indicated by a homogeneous coordinate system representation, given by:

$$\begin{bmatrix} x_i \\ 1 \end{bmatrix} \propto P_{mkr} \begin{bmatrix} X_i \\ 1 \end{bmatrix} \quad (1)$$

Using an intrinsic parameter K (3×3 matrix) of the image capturing unit 1A, and a rotation matrix $R_{mkr}$ (3×3 matrix) and translation vector $t_{mkr}$=(tx, ty, tz) which are uniquely defined based on $s_{lmkr}$, $P_{mkr}$ is defined by:

$$P_{mkr}=K[R_{mkr}|t_{mkr}] \quad (2)$$

Furthermore, ∝ indicates that the vectors on the two sides are equal to each other except for the length. Based on the formulation, $R_{mkr}$ and $t_{mkr}$ representing the camera position and orientation are obtained by the least square method based on the intrinsic parameter K of the camera of the image capturing unit LA, which has been calibrated in advance, and the three-dimensional coordinate point $X_i$ and its projected coordinate point $x_i$ of each corner point of the marker. That is, the estimated value $s_{lmkr}$ at a given timing in iterative processing is updated to $S_{lmkr}+\delta s_{lmkr}$ using an appropriately defined update amount $\delta s_{lmkr}$, and this processing is iterated until the value converges, thereby obtaining a solution. In this embodiment, the Gauss-Newton method is used as the least square method. A cost function $E(s_{lmkr})$ of iterative calculation indicates a re-projection error of $X_i$ obtained from $s_{lmkr}$.

<Estimation of Camera Position and Orientation $s_{lftr}$>

After estimating $s_{lmkr}$ using the marker detection result, $s_{lftr}$ is estimated by performing the same processing using $s_{lmkr}$ as an initial value. At this time, the three-dimensional coordinate point of the feature point in the map associated in step S1007 is defined by $X_j = (X_j, Y_j, Z_j)$ (j=1, ..., n), and the image coordinate point of the feature point on the input image is defined by $x_j = (x_j, y_j)$ (j=1, ..., n). Estimated $s_{lftr}$ is stored in the memory.

Note that in step S1009, for the sake of descriptive simplicity, the position and orientation estimation processing has been explained by dividing the processing into two stages of position and orientation estimation based on the marker and position and orientation estimation based on the feature points. However, association may be weighted to perform the estimation processes at once, or position and orientation estimation based on the marker need not be performed.

(Step S1010: Second Position and Orientation Estimation processing)

In step S1010, the second position and orientation estimation unit 109 estimates a camera position and orientation $s_{2ftr}$, similarly to step S1009, by excluding the detection result of the marker selected in step S1008 and the association information of the feature points included in the marker, and stores the camera position and orientation $s_{2ftr}$ in the memory.

(Step S1011: Stability Obtaining Processing)

In step S1011, the stability obtaining unit 110 calculates the difference between the camera position and orientation $s_{lftr}$ estimated in step S1009 and the camera position and orientation $s_{2ftr}$ estimated in step S1010. Then, based on the difference, the stability when the camera position and orientation is estimated without using the marker selected in step S1008. Since each of $s_{lftr}$ and $s_{2ftr}$ is represented by the translation position vector and rotation vector, as described above, the difference vectors between the translation position vectors and between the rotation vectors are calculated as the stability and stored in the memory.

(Step S1012: Stability Obtaining Result Determination Processing)

In step S1012, the stability obtaining unit 110 determines whether the length of the difference vector between the translation position vectors is larger than a predetermined threshold (for example, 1 mm), and/or determines whether the length of the difference vector between the rotation vectors is larger than a predetermined threshold (for example, 0.1 mm). If at least one of the lengths is larger than the corresponding threshold, it can be determined that the difference is large, that is, the stability is lower than a threshold. Consequently, it is determined that the selected marker is not removable, and the process ends. On the other hand, if both the lengths are equal to or smaller than the corresponding thresholds, respectively, it can be determined that the difference is small, that is, the stability is equal to or higher than the threshold. Consequently, it is determined that the selected marker is removable, and the process advances to step S1013. Note that determination may be performed depending on whether one of these conditions is satisfied.

(Step S1013: Removable Marker Presentation Processing)

Figure 6:
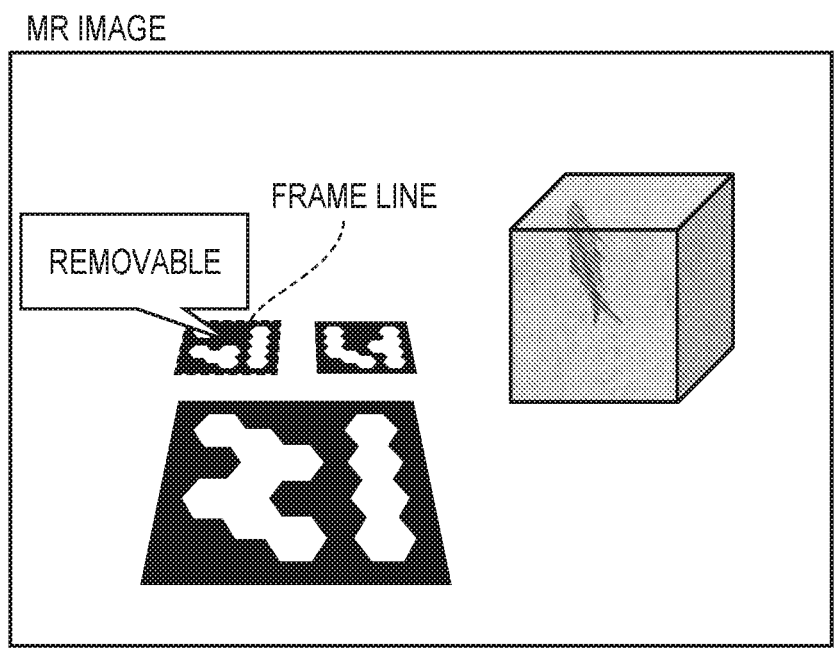
FIG. 6 is a view showing an MR image according to the first embodiment.

In step S1013, the removable marker presentation unit 111 generates an MR image to present, to the user, that the marker selected in step S1008 is removable, and presents the generated MR image. For example, as shown in FIG. 6, in the MR image generation processing, a rectangular frame line and a text "removable" are superimposed and drawn on the marker selected in step S1008 on the input image using the image coordinates obtained when the marker is detected in step S1003. The removable marker presentation unit 111 outputs data of the generated MR image to the external display unit 1C to present it to the user.

Note that an MR image generation method is not limited to the example shown in FIG. 6 as long as it is possible to present, to the user, that the selected marker included in the input image is removable. One of the frame line and the text may be used or the marker may be flickered to indicate that the marker is removable without using the frame line or text.

Then, the series of processes ends, and the information of the removable marker for the obtained image is output. As described above, this embodiment has explained the example of selecting one marker based on the sizes of markers to calculate the stability of estimation of SLAM, calculating a difference in estimation result of SLAM based on the presence/absence of the marker, and determining, based on the difference, whether the marker is removable. Thus, if the image capturing unit 1A captures an image at a predetermined interval, an input image obtained by capturing the latest physical space is input, and removable markers can be successively presented to the user one by one if any.

According to this embodiment, the smallest marker as a removal target is automatically selected. Every time an image is input, the user can recognize, by MR display, whether the selected marker is removable, thereby making it possible to remove the marker without destabilizing estimation of SLAM.

Second Embodiment

<Overview>

The first embodiment has explained the example of selecting one marker based on the sizes of markers to calculate the stability of estimation of SLAM, calculating a difference in estimation result of SLAM based on the presence/absence of the marker, and determining, based on the difference, whether the marker is removable. To the contrary, this embodiment will describe an example of selecting one marker based on the distances of markers from an image capturing unit, determining a difference in position of an image search result based on the presence/absence of the marker, and presenting a text superimposition image (indicating that the marker is removable).

<Apparatus Arrangement>

Figure 7:
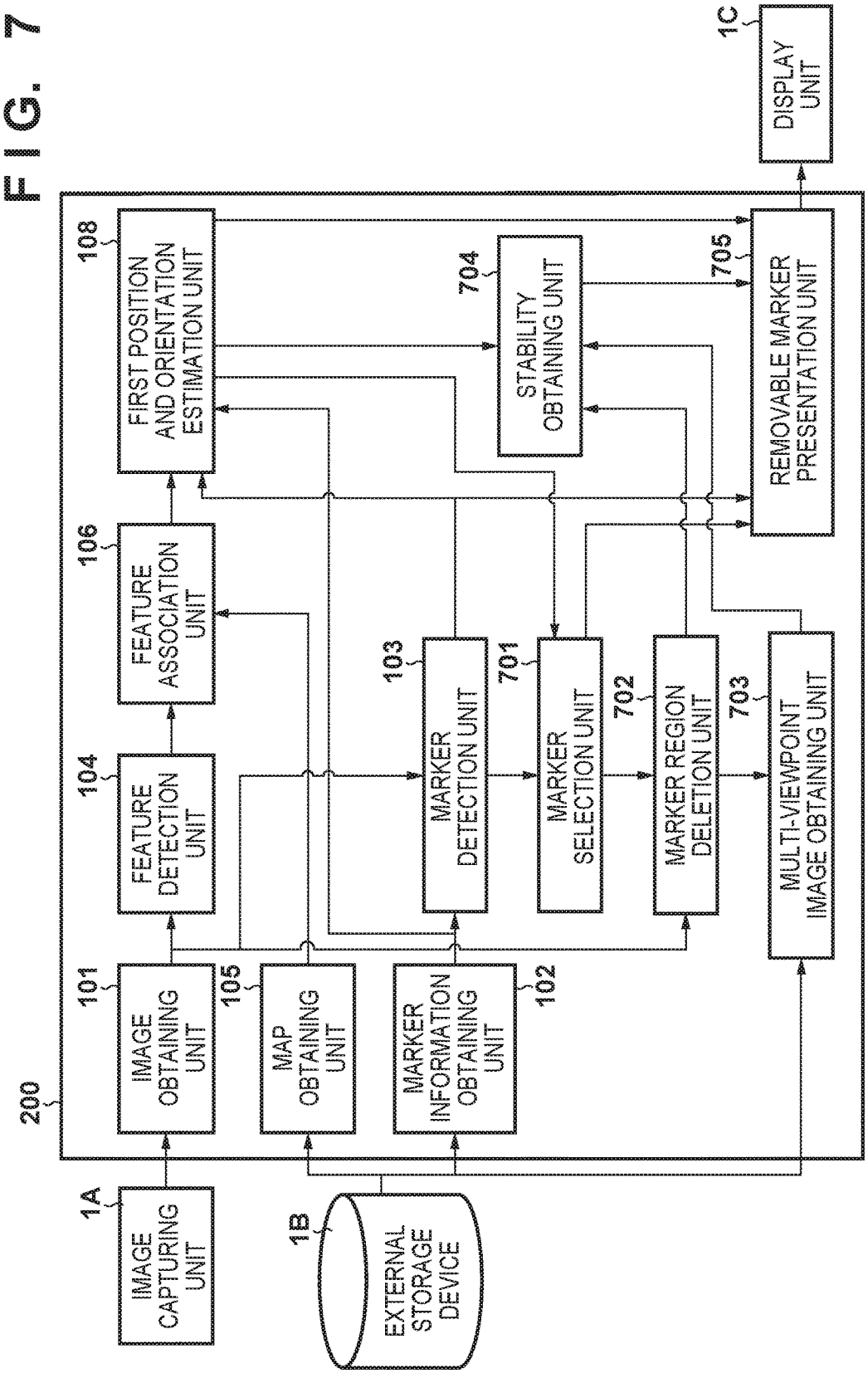
FIG. 7 is a block diagram for explaining the arrangement of an information processing apparatus according to the second embodiment.

A description of the same contents as in the first embodiment will be omitted. FIG. 7 is a block diagram showing an example of the arrangement of an information processing apparatus 200 according to this embodiment. The same components as those of the information processing apparatus 100 shown in FIG. 1 are denoted by the same reference numerals and a detailed description thereof will be omitted.

A marker selection unit 701 selects one marker based on a marker detection result and the first position and orientation estimation result, and stores it in a memory (not shown). A marker region deletion unit 702 deletes, from an input image, an image region of the marker selected by the marker selection unit 701 to generate a marker region deletion image, and stores the generated image in the memory (not shown).

A multi-viewpoint image obtaining unit 703 obtains, as multi-viewpoint images, from an external storage device 1B, sets of images obtained by capturing a physical space at a plurality of viewpoints and the positions and orientations of the viewpoints, and stores the obtained multi-viewpoint images in the memory (not shown). A stability obtaining unit 704 queries the marker region deletion image to select the most similar image from the multi-viewpoint images by an image search, calculates stability by comparing the first position and orientation estimation result with the position and orientation of the multi-viewpoint image, and stores the stability in the memory (not shown).

A removable marker presentation unit 705 generates, based on the stability calculated by the stability obtaining unit 704, a text superimposition image to present, to the user, that the marker detected by a marker detection unit 103 and selected by the marker selection unit 701 is removable, and outputs the generated image to an external display unit 1C.

<Processing>

Figure 8:
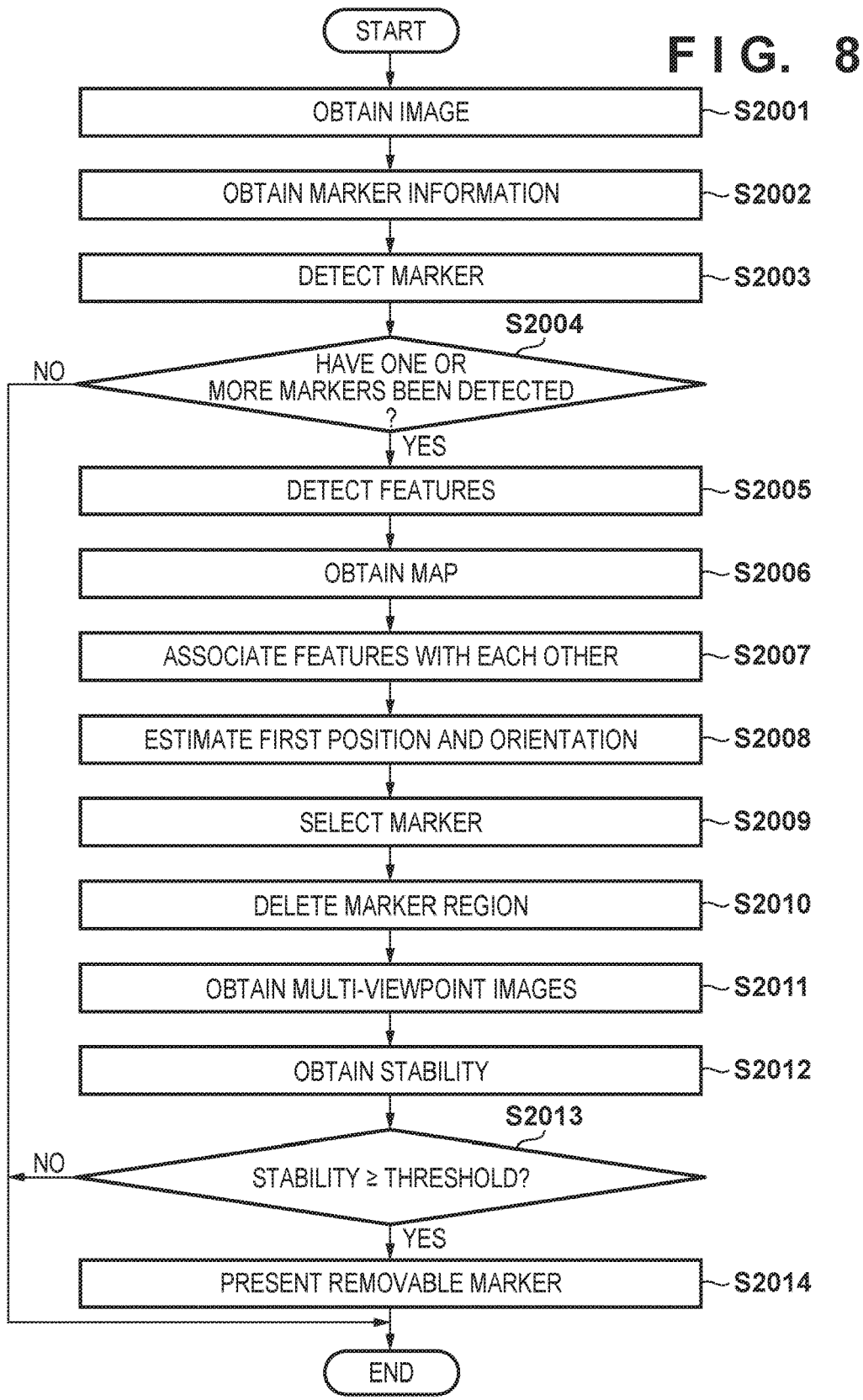
FIG. 8 is a flowchart illustrating the procedure of processing by the information processing apparatus according to the second embodiment.

The procedure of processing executed by the information processing apparatus 200 according to this embodiment will be described with reference to a flowchart shown in FIG. 8. Especially, a stability calculation method and a removable marker presentation method according to this embodiment will be described in detail. Processes in steps S2001 to S2008 are the same as those in steps S1001 to S1007 and S1009 described with reference to FIG. 2 in the first embodiment, respectively.

(Step S2009: Marker Selection Processing)

In step S2009, the marker selection unit 701 selects, from markers detected in step S2003, a marker having the shortest distance from an image capturing unit 1A. Information obtained in step S2002 is used for the three-dimensional coordinates of the marker, and information estimated in step S2008 is used for the three-dimensional coordinates of the image capturing unit 1A. The marker selection unit 701 stores the ID of the selected marker in the memory.

Note that a marker selection method according to this embodiment assumes that the user holds the information processing apparatus 200 by hands and confirms whether the marker is removable, and thus the marker having the shortest distance from the image capturing unit 1A is selected. However, depending on the positional relationship between the user and the information processing apparatus 200, a marker having the shortest distance from the image capturing unit 1A within a range of 1 m to 2 m may be selected. The present invention is not limited to these methods. Alternatively, a plurality of markers may be sorted in ascending or descending order of distance and selected, or a plurality of markers may be selected randomly.

(Step S2010: Marker Region Deletion Processing)

Figure 9:
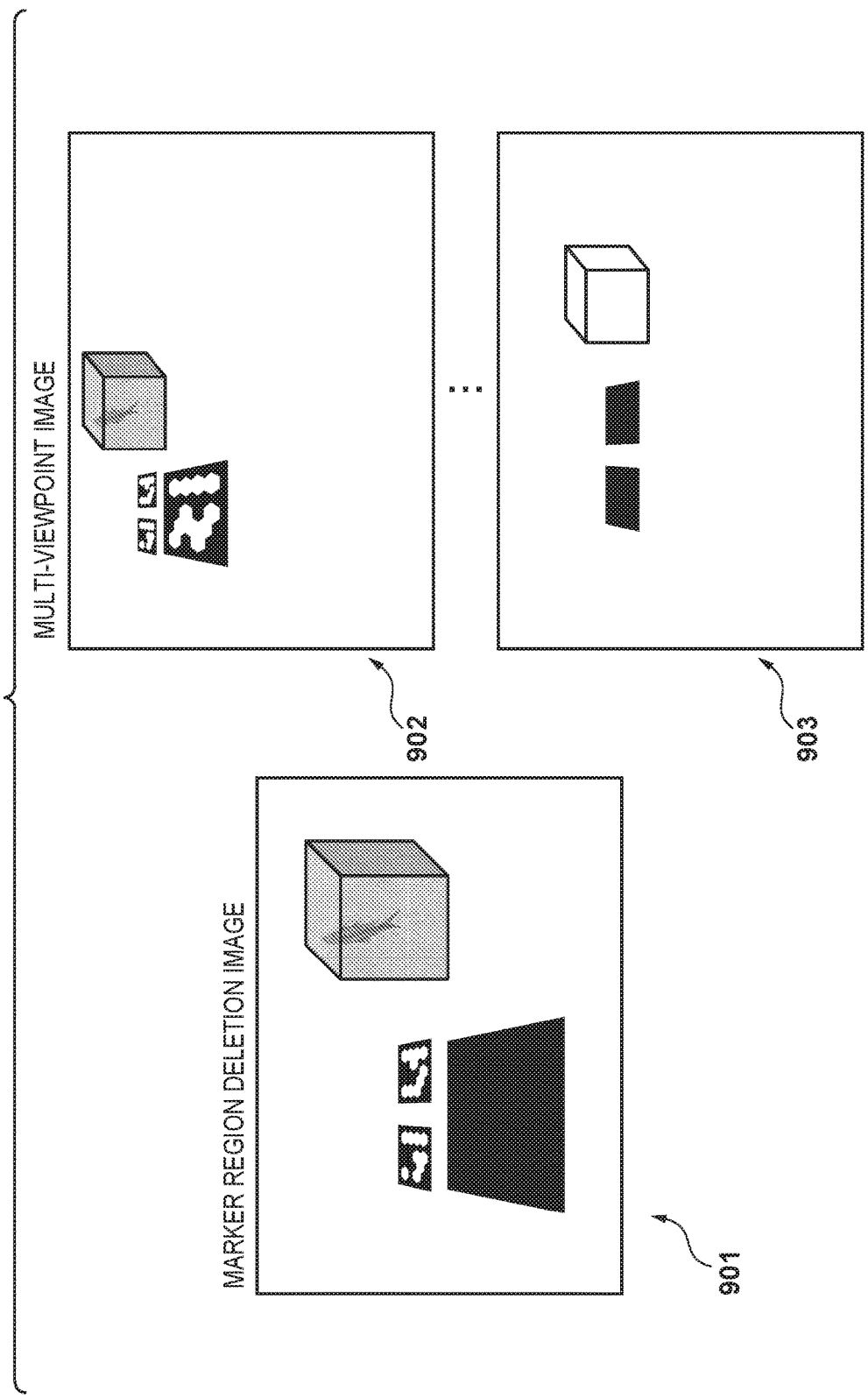
FIG. 9 is a view showing a marker region deletion image and multi-viewpoint images according to the second embodiment.

In step S2010, the marker region deletion unit 702 deletes, from the input image, the image region of the marker selected in step S2009 (sets all luminance values to 0), thereby generating a marker region deletion image shown in 901 of FIG. 9. Then, the generated marker region deletion image is stored in the memory.

Note that in the marker region deletion method according to this embodiment, the image region of the marker is deleted (all the luminance values are set to 0) to virtually reproduce, by a simple method, the physical space when no selected marker exists. The present invention, however, is not limited to this. A specific value may be designated, interpolation may be performed using the luminance values of peripheral pixels, or an inpainting algorithm described in Norihiko Kawai, Tomokazu Sato, and Naokazu Yokoya, "Image Inpainting by Minimizing Energy Based on Pattern Similarity Considering Brightness Change and Spatial Locality", the IEICE transactions on information and systems, Vol. J91-D, No. 9, pp. 2293-2304, September 2008 may be used.

(Step S2011)

In step S2011, the multi-viewpoint image obtaining unit 703 obtains, as multi-viewpoint images, from the external storage device 1B, sets of images obtained by capturing the physical space at a plurality of viewpoints and the positions and orientations of the images, and stores the obtained multi-viewpoint images in the memory (not shown). In FIGS. 9, 902 and 903 show examples of the multi-viewpoint images. In 902, an image obtained by capturing the same physical space as that of the input image from another viewpoint is shown. In 903, an image which is similar to the input image but is obtained by capturing a physical space different from that of the input image is shown.

(Step S2012: Stability Obtaining Processing)

In step S2012, the stability obtaining unit 704 calculates the stability of return (re-localization) processing of SLAM when the marker selected in step S2009 is removed. That is, the stability obtaining unit 704 queries the marker region deletion image to select the most similar image from the multi-viewpoint images by an image search, and calculates the stability of the re-localization processing of SLAM by an image search by comparing the first position and orientation estimation result with the position and orientation of the multi-viewpoint image.

The re-localization processing is processing for obtaining the position and orientation by selecting, from the multi-viewpoint images, an image similar to the input image the most by an image search when estimation of SLAM fails, and returning the SLAM processing. The three-dimensional distance between the three-dimensional position obtained as a result of the first position and orientation estimation and the three-dimensional position of the multi-viewpoint image is calculated as the stability.

As an image search method, a method of calculating the similarity between two images using BoF (Bag of Words) described in J. Sivic and A. Zisserman, "Video google: A text retrieval approach to object matching in videos", Proc. ICCV2003, Vol. 2, pp. 1470-1477, 2003. That is, in this method, if histograms generated by distributing feature points included in the two images depending on the features are similar to each other, it is determined that the two images are similar to each other. For example, if an image captured at a position close to the input image, like the multi-viewpoint image shown in 902 of FIG. 9, is selected, stability of 5 cm is obtained. If an image which is similar to the input image but has a capturing position different from that of the input image, like the multi-viewpoint image shown in 903 of FIG. 9, is selected, stability of 300 cm is obtained.

(Step S2013: Stability Obtaining Result Determination Processing)

In step S2013, the stability obtaining unit 704 determines whether the stability (three-dimensional distance) calculated in step S2012 is equal to or higher than a threshold (for example, 10 cm). If the stability is equal to or higher than the threshold, it is determined that the re-localization processing becomes unstable when the marker is removed, thereby ending the process. On the other hand, if the stability is lower than the threshold, the process advances to step S2014.

(Step S2014: Removable Marker Presentation Processing)

Figure 10:
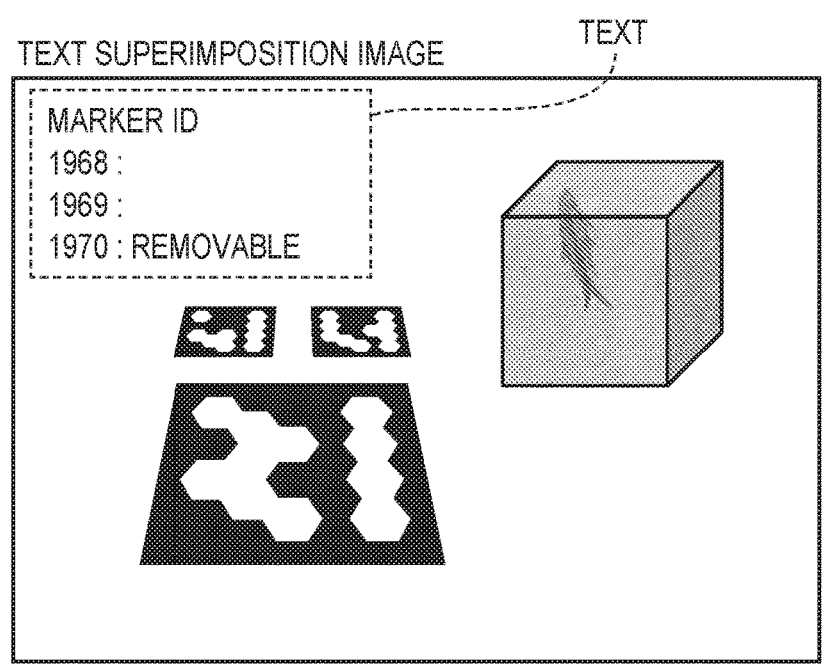
FIG. 10 is a view showing a text superimposition image according to the second embodiment.

In step S2014, based on the determination result in step S2013, the removable marker presentation unit 705 generates a text superimposition image by superimposing and displaying a text on the input image to present, to the user, that the marker selected in step S2009 is removable. FIG. 10 shows an example of the text superimposition image. The removable marker presentation unit 705 outputs data of the generated text superimposition image to the external display unit 1C to present it to the user.

As described above, this embodiment has explained the example of selecting one marker based on the distances of markers from the image capturing unit, determining a difference in position of an image search result based on the presence/absence of the marker, and presenting a text superimposition image (indicating that the marker is removable). According to this embodiment, it is possible to select the marker closest to the user, and present whether the marker is removable. Furthermore, it is possible to calculate the stability of return (re-localization) processing when estimation of SLAM fails. When compared to the first embodiment in which position and orientation estimation is performed twice, it is possible to calculate the stability with a smaller calculation processing amount.

Third Embodiment

<Overview>

The first embodiment has explained the example of selecting one marker based on the sizes of markers to calculate the stability of estimation of SLAM, calculating a difference in estimation result of SLAM based on the presence/absence of the marker, and determining, based on the difference, whether the marker is removable. The second embodiment has explained the example of selecting one marker based on the distances of markers from an image capturing unit, determining a difference in position of an image search result based on the presence/absence of the marker, and presenting a text superimposition image (indicating that the marker is removable).

To the contrary, this embodiment will describe an example of selecting one marker based on the distribution of markers, calculating stability based on the distribution of feature points on an input image, and presenting an MR image based on the stability.

<Apparatus Arrangement>

Figure 11:
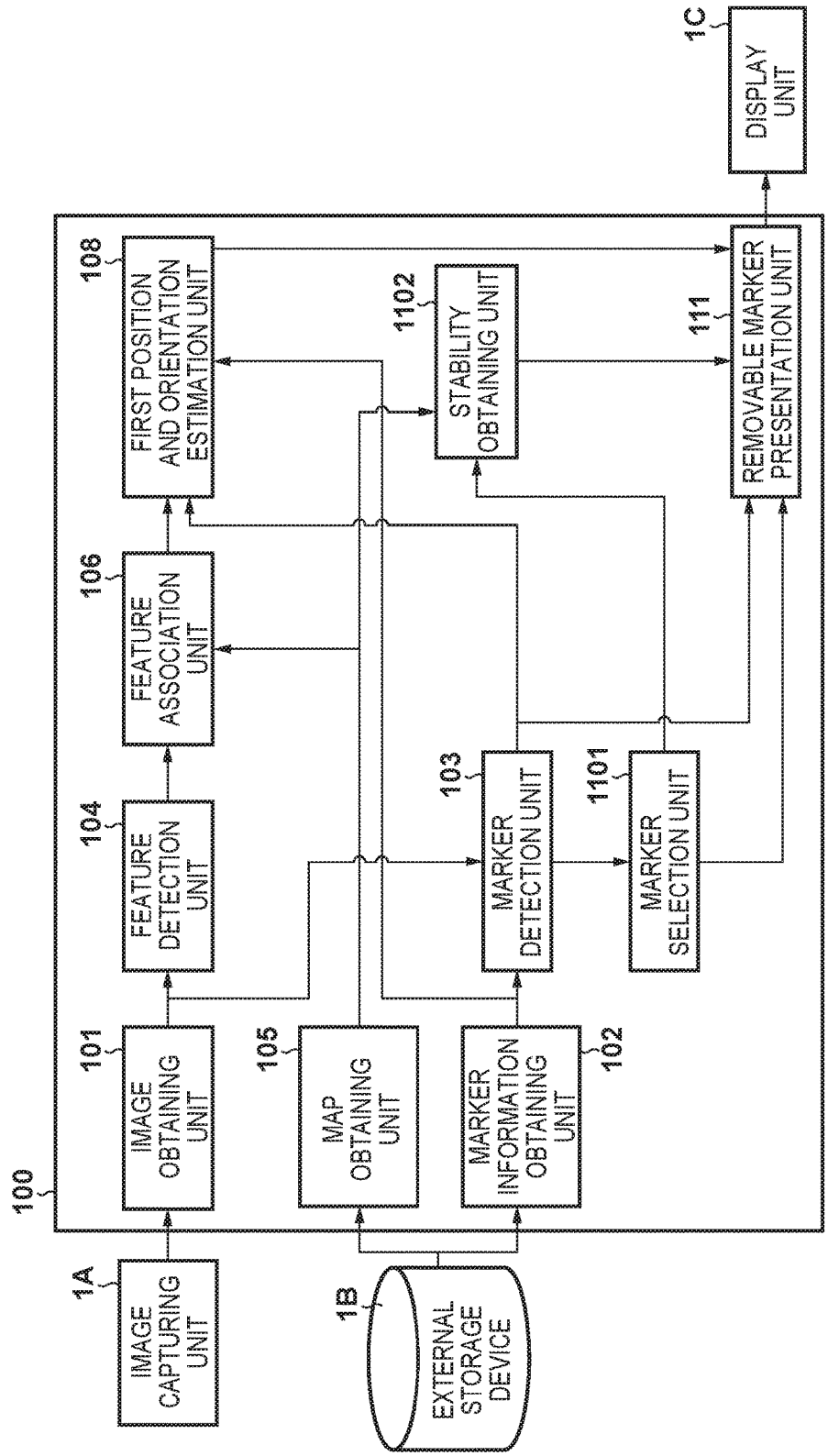
FIG. 11 is a block diagram for explaining the arrangement of an information processing apparatus according to the third embodiment.

A description of the same contents as in the first embodiment will be omitted. FIG. 11 is a block diagram showing an example of the arrangement of an information processing apparatus 300 according to this embodiment. The same components as those of the information processing apparatus 100 shown in FIG. 1 are denoted by the same reference numerals and a detailed description thereof will be omitted.

A marker selection unit 1101 selects one marker based on the distribution of markers detected by a marker detection unit 103, and stores the ID of the marker in a memory (not shown). A stability obtaining unit 1102 calculates stability based on the distribution of feature points obtained by a map obtaining unit 105 and the marker selected by the marker selection unit 1101, and stores the stability in the memory (not shown).

<Processing>

Figure 12:
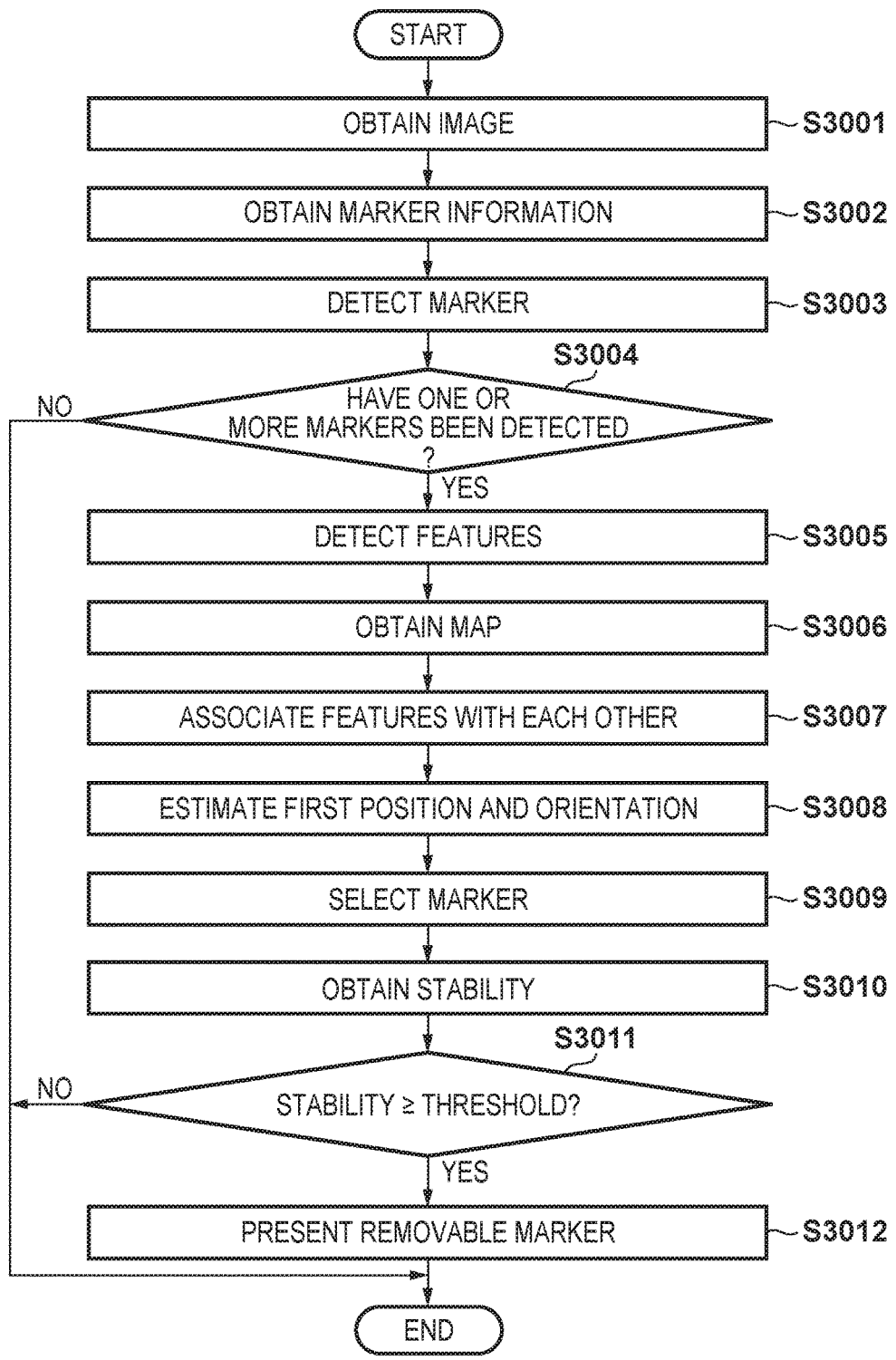
FIG. 12 is a flowchart illustrating the procedure of processing by the information processing apparatus according to the third embodiment.

The procedure of processing executed by the information processing apparatus 300 according to this embodiment will be described with reference to a flowchart shown in FIG. 12. Especially, a stability calculation method and a removable marker presentation method according to this embodiment will be described in detail. Processes in steps S3001 to S3008 and S3012 are the same as those in steps S1001 to S1007, S1009, and S1013 described with reference to FIG. 2 in the first embodiment, respectively.

(Step S3009: Marker Selection Processing)

Figure 13:
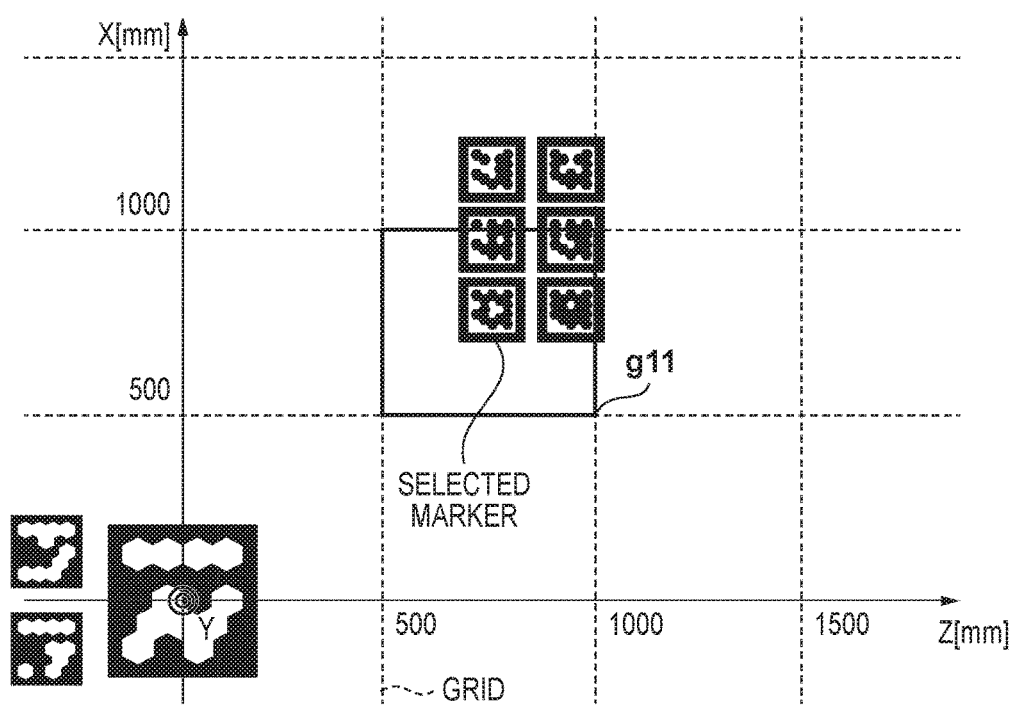
FIG. 13 is a view showing the distribution of markers in a physical space according to the third embodiment.

In step S3009, the marker selection unit 1101 calculates the distribution of markers based on information of the positions of the markers in a physical space obtained in step S3002, and selects small markers that are arranged most densely. FIG. 13 is a view showing the distribution of the markers in the physical space according to this embodiment. FIG. 13 shows a case in which rectangular planar markers are distributed on the X-Z plane in the physical space. The number of marker center coordinate points included in each of 500-mm square grids obtained by dividing the X-Z plane is counted. If the marker center coordinate point is on the boundary of the grids, the coordinate values are rounded up. In the example of FIG. 13, the number of markers in a grid g11, which is four, is largest. Among the four markers included in the grid g11, a marker closest to the origin of the coordinate system is selected.

Note that in this marker selection processing, only one marker is selected. However, a plurality of markers may be selected from a grid including the largest number of markers, or the grids may be sorted in descending order of the number of markers and a plurality of markers may be selected from each grid.

(Step S3010: Stability Obtaining Processing)

In step S3010, the stability obtaining unit 1102 calculates the stability of estimation of the position and orientation of the camera of an image capturing unit 1A based on the distribution of feature points outside the marker selected in step S3009 using the feature points obtained by the map obtaining unit 105.

Figure 14:
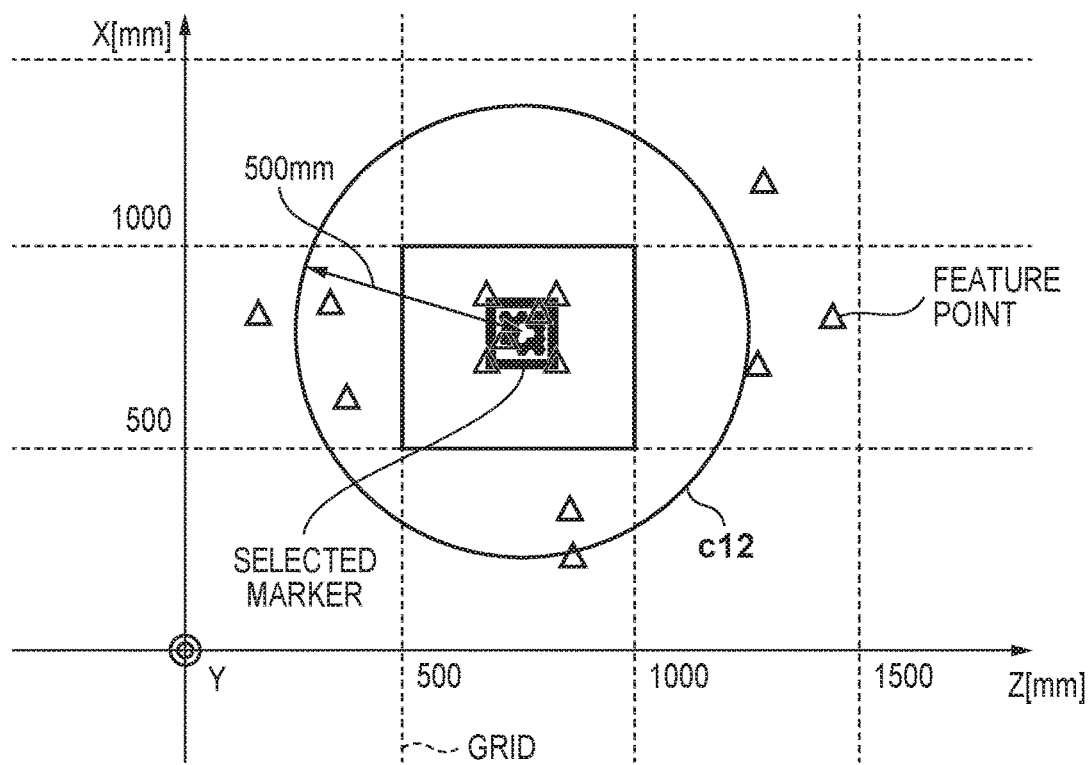
FIG. 14 is a view showing the distribution of feature points in a map according to the third embodiment.

To calculate the stability, the number of feature points that fall outside the selected marker and within a predetermined distance range (for example, a radius of 500 mm) of the marker is counted. FIG. 14 is a view showing the distribution of feature points in a map around the selected marker according to this embodiment. The number i of feature points that fall outside the selected marker and within a radius of 500 mm is 3, and the stability in this case is calculated by:

$$1 - \frac{1}{i} = 1 - \frac{1}{3} = 0.66 \qquad (3)$$

(Step S3011: Stability Obtaining Result Determination Processing)

In step S3011, the stability obtaining unit 1102 determines whether the stability calculated in step S3010 is equal to or higher than a threshold (for example, 0.95). If the stability is equal to or higher than the threshold, the process advances to step S3012; otherwise, the process ends.

As described above, in this embodiment, one marker is selected based on the distribution of markers, the stability of estimation of SLAM is calculated based on the distribution of feature points on an input image, and an MR image is presented based on the stability.

This can select a marker independently of the position and orientation of the image capturing unit, and calculate the stability based on the distribution of the feature points on the input image.

According to the present invention, it is possible to readily recognize a removable marker without destabilizing estimation of the position and orientation.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-233501, filed Nov. 30, 2016, which is hereby incorporated by reference wherein in its entirety.

What is claimed is:

1. An information processing apparatus comprising:
   one or more processors;
   a memory coupled with the one or more processors and including instructions stored thereon that, when executed by the one or more processors, cause the information processing apparatus to function as:
   a marker detection unit configured to detect one or more markers from an image obtained by capturing a physical space by an image capturing unit;
   a feature detection unit configured to detect a feature from the image;
   a first estimation unit configured to estimate a first set of position and orientation of the image capturing unit based on a detection result obtained by the marker detection unit and a detection result obtained by the feature detection unit;
   a selection unit configured to select some markers of the one or more markers detected by the marker detection unit;
   a second estimation unit configured to estimate a second set of position and orientation of the image capturing unit based on a feature not included in the some markers among the detection result obtained by the feature detection unit;
   a stability obtaining unit configured to obtain stability of estimation of the set of position and orientation when the some markers of the one or more markers are removed based on the first set of position and orientation estimated by the first estimation unit and the second set of position and orientation estimated by the second estimation unit; and
   a determination unit configured to determine, based on the stability, whether the some markers are removable.

2. The apparatus according to claim 1, wherein the instructions, when executed by the one or more processors, further cause the information processing apparatus to function as:
   a marker region deletion unit configured to generate a marker region deletion image by designating and deleting regions of the some markers from the image; and
   a multi-viewpoint image obtaining unit configured to obtain a plurality of images by capturing the physical space at a plurality of positions and orientations including the first set of position and orientation estimated by the first estimation unit,
   wherein the stability obtaining unit obtains similarities between the marker region deletion image and the plurality of images, and obtains the stability based on the similarities.

3. The apparatus according to claim 1, wherein the stability obtaining unit obtains the stability based on a distribution of a feature outside the some markers.

4. The apparatus according to claim 3, wherein the stability obtaining unit obtains the stability based on a feature included within a predetermined range from the some markers.

5. The apparatus according to claim 1,
   wherein the selection unit selects the some markers based on attributions of the one or more markers detected by the marker detection unit.

6. The apparatus according to claim 5, wherein the selection unit selects the some markers based on sizes of the detected one or more markers.

7. The apparatus according to claim 5, wherein the selection unit selects the some markers based on distances of the detected one or more markers from the image capturing unit.

8. The apparatus according to claim 5, wherein the selection unit selects the some markers based on a distribution of the detected one or more markers.

9. The apparatus according to claim 1, wherein the instructions, when executed by the one or more processors, further cause the information processing apparatus to function as:
   an output unit configured to output, to a display unit, information indicating that the some markers are removable, if the determination unit determines that the some markers are removable.

10. The apparatus according to claim 1, wherein the stability obtaining unit calculates the difference between the first position and orientation and the second position and orientation, wherein the determination unit determines the some markers are removable if the difference is smaller than a predetermined threshold.

11. The apparatus according to claim 1, wherein the stability obtaining unit calculates the difference between the first set of position and orientation and the second set of position and orientation,
   wherein the determination unit determines the some markers are removable if the difference is smaller than a predetermined threshold.

12. A control method for an information processing apparatus, comprising:
- detecting one or more markers from an image obtained by capturing a physical space by an image capturing unit;
- detecting a feature from the image;
- estimating a first set of position and orientation of the image capturing unit based on a detection result obtained in the detecting the one or more markers and a detection result obtained in the detecting the feature;
- selecting some markers of the one or more detected markers;
- estimating a second set of position and orientation of the image capturing unit based on a feature not included in the some markers among the detection result obtained in the detecting the feature;
- obtaining stability of estimation of the set of position and orientation when the some markers of the one or more markers are removed based on the estimated first set of position and orientation and the estimated second set of position and orientation; and
- determining, based on the stability, whether the some markers are removable.

13. A non-transitory computer-readable storage medium storing a computer program for causing a computer to execute each step of a control method for an image processing apparatus, the method comprising:
- detecting one or more markers from an image obtained by capturing a physical space by an image capturing unit;
- detecting a feature from the image;
- estimating a first set of position and orientation of the image capturing unit based on a detection result obtained in the detecting the one or more markers and a detection result obtained in the detecting the feature;
- selecting some markers of the one or more detected markers;
- estimating a second set of position and orientation of the image capturing unit based on a feature not included in the some markers among the detection result obtained in the detecting the feature;
- obtaining stability of estimation of the set of position and orientation when some markers of the one or more markers are removed based on the estimated first set of position and orientation and the estimated second set of position and orientation; and
- determining, based on the stability, whether the some markers are removable.

* * * * *